United States Patent
Shorrock et al.

(10) Patent No.: US 6,283,065 B1
(45) Date of Patent: Sep. 4, 2001

(54) ANIMAL COLLAR AND STUD ASSEMBLY THAT PROMOTES ANIMAL SAFETY AND WELL-BEING

(75) Inventors: John Ernest Turner Shorrock; Barrs S. Lewis, both of Minneapolis, MN (US)

(73) Assignee: BSL Investments III, Inc., Minneapolis, MN (US)

( * ) Notice: Subject to any disclaimer, the term of this patent is extended or adjusted under 35 U.S.C. 154(b) by 0 days.

(21) Appl. No.: 09/435,944

(22) Filed: Nov. 9, 1999

(51) Int. Cl.[7] ............................................ A01K 27/00
(52) U.S. Cl. ..................................... 119/863; 119/859
(58) Field of Search ................................... 119/863, 856, 119/858, 859, 860; D30/152; 63/3.1, 3.2; D11/201, 3, 6, 7, 8; 2/312, 314, 315, 319

(56) References Cited

U.S. PATENT DOCUMENTS

| | | | |
|---|---|---|---|
| 254,156 | * 2/1882 | Ricker et al. | |
| D. 336,055 | 6/1993 | Juliana et al. | D10/106 |
| 1,127,249 | * 2/1915 | Hughes . | |
| 1,574,962 | * 3/1926 | Fischer . | |
| 2,065,946 | * 12/1936 | Mader . | |
| 2,346,946 | * 4/1944 | Schacht . | |
| 2,871,592 | * 2/1959 | Polzin . | |
| 3,592,028 | 7/1971 | Monica | 70/57 |
| 3,641,984 | * 2/1972 | Lanus | 119/863 |
| 3,777,586 | 12/1973 | Stirton | 74/231 |
| 3,830,080 | * 8/1974 | Friedlander | 63/3.1 |
| 3,983,483 | * 9/1976 | Pando | 455/575 |
| 4,020,795 | * 5/1977 | Marks | 119/654 |
| 4,114,151 | 9/1978 | Denne et al. | 343/6.8 |
| 4,129,855 | 12/1978 | Rodrian | 340/152 |
| 4,137,660 | * 2/1979 | Dettmann et al. . | |
| 4,174,553 | * 11/1979 | Schrougham et al. | 24/321 |
| 4,309,797 | * 1/1982 | Schrougham . | |
| 4,325,146 | 4/1982 | Lennington | 455/604 |
| 4,364,043 | 12/1982 | Cole et al. | 340/825.54 |
| 4,398,500 | 8/1983 | Koronkiewicz | 119/109 |
| 4,413,588 | * 11/1983 | Lindholm | 119/760 |
| 4,459,590 | 7/1984 | Saulnier | 340/825.54 |
| 4,463,353 | 7/1984 | Kuzara | 340/825.54 |
| 4,463,706 | 8/1984 | Meister et al. | 119/51 R |
| 4,491,090 | * 1/1985 | Almeida | 119/863 |
| 4,762,088 | * 8/1988 | Chapman et al. | 119/859 |
| 4,854,328 | 8/1989 | Pollack | 128/736 |
| 4,857,893 | 8/1989 | Carroll | 340/572 |
| 5,028,918 | 7/1991 | Giles et al. | 340/825.54 |
| 5,041,826 | 8/1991 | Milheiser | 340/825.54 |
| 5,150,114 | 9/1992 | Johansson | 340/825.54 |
| 5,176,106 | 1/1993 | Casto et al. | 119/106 |
| 5,241,923 | 9/1993 | Janning | 119/721 |
| 5,367,987 | * 11/1994 | Lin | 119/858 |
| 5,373,815 | * 12/1994 | Sagebiel | 119/654 |
| 5,499,626 | 3/1996 | Willham et al. | 128/630 |
| 5,511,553 | 4/1996 | Segalowitz | 128/696 |
| 5,520,417 | 5/1996 | Kennemer | 283/74 |
| 5,535,106 | * 7/1996 | Tangen | 362/108 |
| 5,570,081 | 10/1996 | Holstrom | 340/573 |
| 5,653,197 | * 8/1997 | Massaro et al. | 119/858 |
| 5,690,365 | 11/1997 | Fascenelli, Jr. et al. | 283/67 |
| 5,818,354 | * 10/1998 | Gentry | 340/870.16 |

* cited by examiner

*Primary Examiner*—Charles T. Jordan
*Assistant Examiner*—Yvonne R. Abbott
(74) *Attorney, Agent, or Firm*—Kagan Binder, PLLC

(57) ABSTRACT

Collar stud that can be attached to an animal collar to function as a tag, collar lock, and/or electronic identification device. The stud includes a cap positionable adjacent an exterior of the collar and a base that is positionable adjacent an interior surface of the collar. A linkage interconnects the cap and base in a spaced apart fashion to allow a portion of the collar to be sandwiched between the interconnected cap and base. At least a portion of the linkage extends through an aperture of the collar portion and helps secure the stud to the collar portion. A transponder is preferably incorporated into the stud, wherein the transponder includes a memory storing retrievable information comprising an identification code. The code can be used to access a corresponding data record in a database.

48 Claims, 10 Drawing Sheets

ANIMAL COLLAR AND STUD ASSEMBLY THAT PROMOTES ANIMAL SAFETY AND WELL-BEING

FIELD OF THE INVENTION

The present invention is in the field of animal collars. More specifically, the present invention relates to animal collars having studs attached to the collars, wherein the studs can function as tags, collar locks, and/or electronic identification devices.

BACKGROUND OF THE INVENTION

The majority of pets wear collars. A typical collar includes a strap or length of chain whose ends are held together by a suitable closure device, such as a buckle, clip, hasp, rings, or the like. One or more tags including information about the animal are usually attached to a collar. Three kinds of tags are most common. A first tag includes information about the pet and/or its owner, such as the pet's name, the owner's name, a phone number at which the owner can be reached, and/or an address at which the owner can be reached. A license or registration tag may also be worn by the pet as required by laws and regulations. A third tag that includes information confirming current rabies vaccination of the animal may also be worn as required by laws and regulations.

Conventional tags generally are attached to a metal collar ring and hang from the collar. Such tags jostle and jingle against each other whenever the animal moves. The jingling noise can be irritating. Hanging tags also pose a danger to humans, particularly small children, who can be hurt by contact with such tags if the animal is startled or otherwise moves too quickly. Hanging tags also pose a risk to the animal wearing the tag. Animals can inadvertently catch hanging tags in thick underbrush or between fence or deck boards, trapping and perhaps choking the animal. It would be desirable to have a tag that can be attached to a collar that does not hang loose and that does not jingle with other tags attached to the same collar.

Animal collars may be used for any of a variety of purposes. Containment collars are used to help control or restrain an animal. Choke collars, harnesses, pronged chain collars, nylon collars, cotton collars, leather collars, and the like are all used for containment. Training collars are used to help train an animal and also come in many forms. It is also known to topically or transdermally deliver therapeutic agents via a medicinal collar. Flea and tick collars, and anti-asthma collars are examples of medicinal collars. Collars may also be used for identification, adornment, or the like.

Collars can be lost for a variety of reasons. The owner or controller can remove the collar and then forget to replace it. For example, at nighttime, some owners remove an animal's collar so that tags on the collar do not jingle when the animal moves. Additionally, most closures or necklaces are not locked and can be easily opened and removed without the owner's consent. Children often remove collars without permission. Collars may also be pilfered by a third party. Collars may also inadvertently open and fall off of an active animal. Of course, once a collar is removed for whatever reason, identification for the animal is also removed.

There are many circumstances when it is desirable to include identification information on an animal collar. Such information is helpful when a pet gets lost. If identification information, such as the owner's name, address, and or phone number, is provided on the pet's collar, the owner of a lost pet can be contacted and then reunited with the pet. However, it is very difficult to locate the owner of a lost animal when the animal's collar to which the information has been attached is lost, pilfered, or otherwise missing or damaged. Accordingly, there is a need for a more secure approach for attaching identification information to an animal collar.

Identification information, especially electronically discernible identification information, is also helpful to ensure that a particular action occurs only in response to the presence of a particular animal. For instance, electronic pet doors are available from a number of commercial sources including Pet Doors USA, Inc. and Reilor Ltd. ("Staywell" brand). These pet doors open in response to a signal from an electronic device, such as a transponder, attached to the animal's collar. The electronic device typically stores a unique identification code associated with the corresponding door so that the door can only be opened by a pet whose collar has the right code. However, a pet cannot open one of these doors if the electronic collar is missing. Electronic food dishes are also available under the Staywell brand. These dishes are not actuated by an animal's proximity, but rather include a succession of food compartments that open at set time intervals over a period of time.

A transponder is generally a compact, relatively inexpensive electronic device which includes a memory capable of storing a relatively small amount of data. Transponders having either reprogrammable or one-time programmable memories are known. With a reprogrammable memory, information stored in the memory can be changed and/or updated as often as desired. Additionally, information can be read from the memory as often as desired. A reprogrammable memory is also referred to in the art as a "read/write" type of memory. With a one-time programmable memory, on the other hand, information can be written to the memory only a single time. Thereafter, the stored information can be read from the memory as often as liked, but the information cannot be changed or updated. One-time programmable memories are often referred to in the art as "write once/read many" type of memories.

Transponders may include an internal power source or, alternatively, transponders can be parasitically powered. Internally powered transponders include an internal power supply, such as a battery, for powering transponder operations. The service life of such transponders is limited by the power supply. In contrast, parasitically powered, or passive, transponders do not have an internal power source. Instead, such transponders receive power from an external device such as an interrogation unit. Passive transponders potentially have a very long service life, because the service life of such transponders is not limited by the amount of power stored in an internal power supply.

In a typical transponder operation, an interrogation unit is used to transmit an interrogation signal to the transponder. An antenna incorporated into the transponder receives the interrogation signal. Circuitry processes the interrogation signal and develops a response signal whose content depends upon the transponder's programming and circuitry. After developing the response signal, the transponder then transmits the response signal back to the interrogation unit. Based upon the nature of the response signal, appropriate follow-up action can be taken. If the transponder is of the passive type, circuitry coupled to the antenna also converts the interrogation signal into an accumulated voltage. Such voltage is used to power transponder operations. Transponders have been widely described in the literature, including U.S. Pat. Nos. 5,150,114; 5,041,826; 4,463,706; 4,463,353; 4,459,590; 4,364,043; 4,325,146; 4,129,855; and 4,114,151.

A unique sequence of data bits corresponding to a specific identification code can be easily stored in the memory of a transponder. As a result of this characteristic, the electronic identification tags incorporating transponders have been used as a way to assign unique identification codes to various items or entities. For example, U.S. Pat. No. 5,028,918 describes the use of electronic identity tags for animal identification purposes, herd management, security systems, inventory control, process control, and monitoring the functions of an animal, such as feeding, body temperature and milk production. See also U.S. Pat. Nos. 5,499,626; 5,511,553; and 4,857,893.

Transponders incorporating identification codes have been associated with human patients and animals using invasive techniques. For example, U.S. Pat. No. 5,499,626 describes an approach in which a transponder is subcutaneously injected into a human patient or an animal using a transponder injection device. It would be more desirable if the use of invasive techniques could be avoided.

Transponders incorporating identification codes also have been associated with animals by incorporating a transponder onto a tag and then attaching the tag to the animal in some fashion. For example, U.S. Pat. No. 4,854,328 describes attaching such a tag to a hole punched through an animal's ear. Similarly, U.S. Pat. No. 4,463,706 shows attaching such a tag to a collar worn around an animal's neck.

SUMMARY OF THE INVENTION

The present invention provides a collar stud that can be securely attached to an animal collar to function as a tag, collar lock, temperature sensor, animal access system, animal control system, animal locator system, identification device, and/or the like. When used for one or more of these purposes, the stud of the present invention offers many benefits. The stud preferably attaches directly to the collar and does not hang loose like other tags. The stud, therefore, is silent. There is no jingling of the type associated with conventional tags. This stud eliminates the potential for injury and snagging associated with conventional hanging tags.

The stud is very durable and not easily broken. It does not fall off or get lost as easily as a conventional hanging tag. Thus, depending upon how it is placed upon a collar, it may serve as an effective lock to prevent the collar from inadvertently opening. The stud can also require a special key to attach and detach the stud, making it more difficult for unauthorized personnel to remove a collar that is locked by a stud of the present invention. The collar and stud are thus safe and secure and not easily removed by petty pilfering or tampering.

The stud preferably has a linkage member, e.g., a stud shaft, that extends all the way through the collar to help secure the stud to the collar. The linkage member preferably may include a threaded, self-tapping post that can be rotatably driven through the collar to form its own aperture, thus avoiding the need to pre-drill a hole through the collar to receive the stud. For example, in one embodiment, a stud with a self-tapping, threaded stud shaft can be self-drilled through the collar and then secured to the collar with a nut, collar sleeve, and/or other corresponding securement device that serves as a base to receive the stud shaft and to threadably engage the stud shaft.

The stud offers at least two different identification modes. Either mode, or both, can be used to allow an animal to be easily identified. In one mode, a visually discernible identification code, preferably alphanumeric characters or a unique graphic element analogous to a livestock brand, may be provided on the stud. In another mode, preferred embodiments of the invention may incorporate a transponder (also referred to as an RFID device) programmed with a unique code so that the stud can serve as an electronic identification tag for the host animal.

The identification code can be used for many purposes. For example, the identification code can be used as part of a system that helps to reunite lost pets with their owners. For this purpose, the ID code may not only be incorporated into the stud via visually discernible information and/or a transponder, but it may also be an element of a data record for the animal that is stored in a centralized registry or database containing other information about the animal. Such other information can be a photo of the animal, the owner's name, the owner's phone number, the owner's address, and the like. Thus, if the animal were to ever get lost, instructions could be included on the collar or stud that would allow a third party to contact the database in order to return the animal to its owner.

The code may also be part of a data record of a health care database, wherein the animal's data record also includes not only the ID code, but also medical information about the animal, such as its photo, medical history, next vet visit, vaccination schedule, treatment schedules, birth date, pedigree, and/or the like. As a beneficial service, such a database may also provide the animal's owner with alerts and reminders for any of the foregoing. These may be transmitted to the owner via electronic mail, postal mail, a telephone communication, facsimile, and/or the like.

The stud may also incorporate electronic functions providing the stud with various capabilities to promote the health and well-being of the host animal that wears the stud. For example, the stud and collar incorporating the stud may be operationally coupled to a Global Positioning System service to allow the animal to be located in the event that the animal were to get lost. Electronics incorporated into the collar and stud assembly may also provide access control in which the proximity of the animal is used to actuate a pet door or in which the collar is used in combination with a restrainment device such as invisible (i.e., underground) fencing. The electronics may also promote feed control, wherein the proximity of the pet to its food dish causes the dish to open to allow feeding and then to close when the pet walks away. Such feed control helps keep pet food fresh and also helps keep unwanted pests out of the food. Electronics may also be used for tracking control to help monitor the location or passage of a pet. This is especially useful in entrances to and from homes to warn if a pet were to leave a home inadvertently.

Collars and/or studs of the present invention can also incorporate therapeutic agents that can be administered topically or transdermally when the collar is worn by an animal. The stud when used as a lock helps to prevent removal of the collar so that the therapeutic agent may be administered for the allotted treatment period. In such embodiments, the stud can include a programmable timer coupled to a laser light or other visual or audible alarm to warn that some follow up action is desired, e.g., that the collar should be removed or that another dose is needed. A flashing light on the stud can also be used to enhance animal safety at night.

In one aspect, the present invention relates to a collar locking stud that is attachable to aligned apertures of overlapping portions of an animal collar. The stud includes a cap positionable on an exterior of the collar and a base positionable adjacent an interior surface of the collar. A linkage interconnects the cap and base in a spaced apart fashion to allow a collar portion to be sandwiched between the cap and base. At least a portion of the linkage extends through the aligned apertures and helps secure the stud to the collar. The stud includes a unique identification (ID) code.

In another aspect, the present invention relates to a locked animal collar assembly. A closed collar includes first and second overlapping collar portions. Each portion includes a respective aperture. The apertures are registerably aligned. A collar stud as described herein is attached to the overlapping portions in a manner such that the stud linkage extends through the aligned apertures and helps hold the overlapping portions together.

In another aspect, the present invention relates to a collar and tag assembly. The assembly includes a collar and a tag attached to the collar via a tag shaft that extends through at least a portion of the collar. The tag includes a key engaging fracture by which the tag is attached and detached from the collar.

In another aspect, the present invention includes an animal ID system. A collar stud is positioned on an animal collar. The stud includes a unique ID that is used to identify the host animal wearing the collar. A database includes a data record for the host animal. The data record includes information relating to the animal. The ID code can be used to access the animal's data record.

BRIEF DESCRIPTION OF THE DRAWINGS

The above mentioned and other advantages of the present invention, and the manner of attaining them, will become more apparent and the invention itself will be better understood by reference to the following description of the embodiments of the invention taken in conjunction with the accompanying drawings, wherein.

DETAILED DESCRIPTION OF THE PRESENTLY PREFERRED EMBODIMENTS

Figure 1:
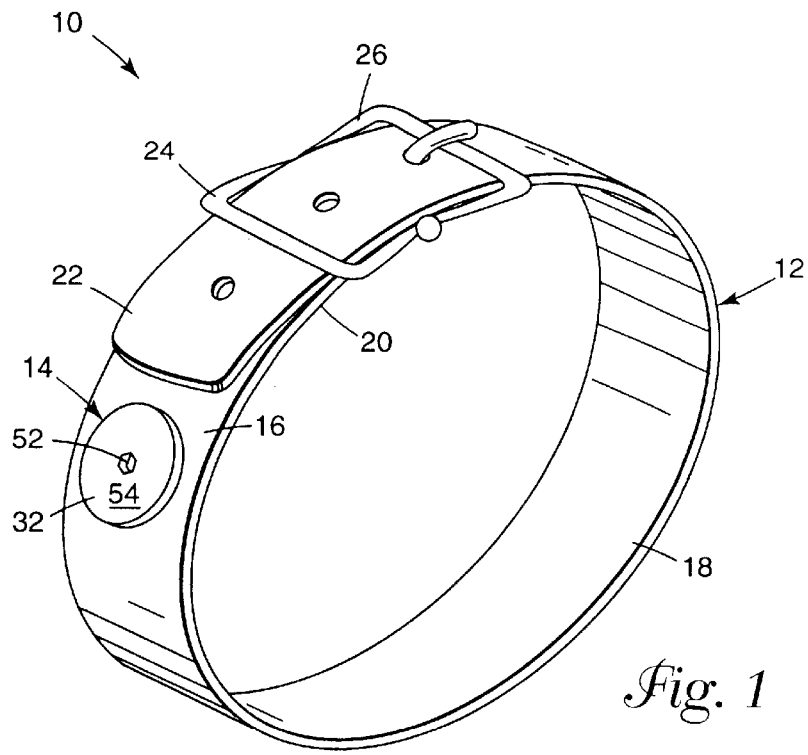
FIG. 1 is a perspective view of a collar and stud assembly of the present invention.
Figure 2:
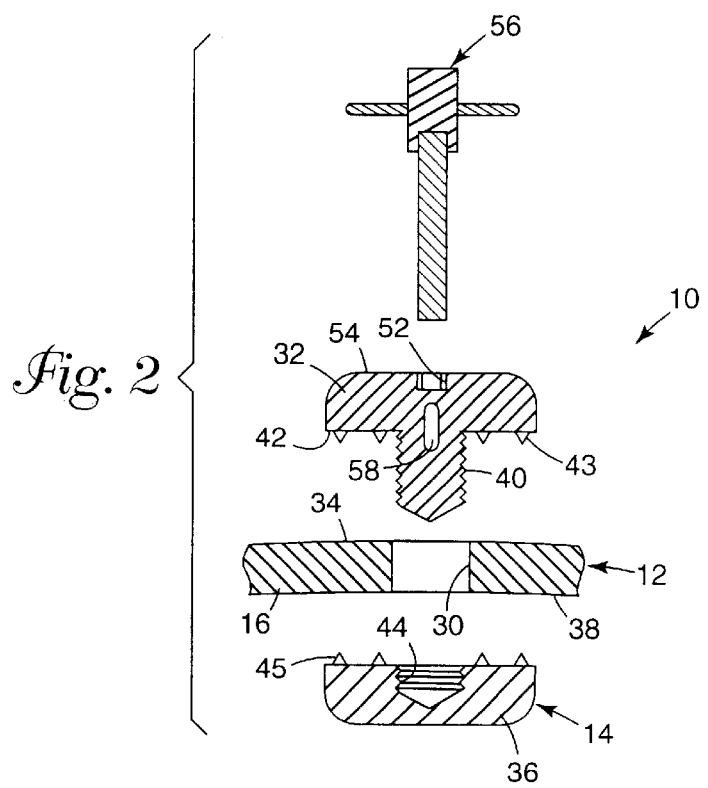
FIG. 2 is an exploded side cross-section of a portion of the collar and stud assembly of FIG. 1.
Figure 3:
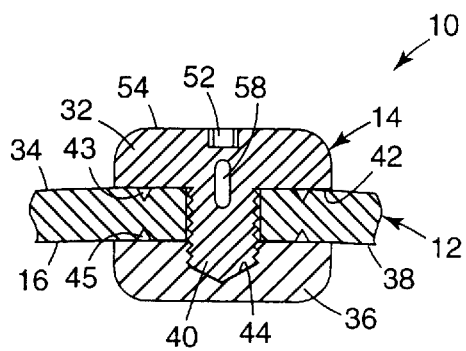
FIG. 3 is a side cross-section of a portion of the collar and stud assembly of FIG. 1.
Figure 4:
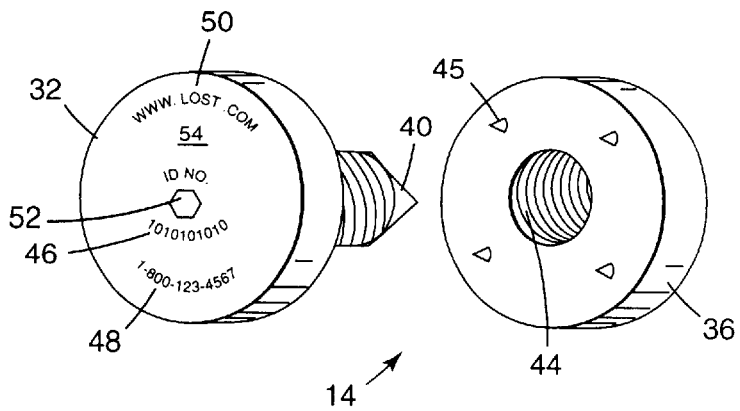
FIG. 4 is a perspective view of the cap and base of the stud used in the assembly of FIG. 1.

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention.

One representative embodiment of a collar and stud assembly 10 of the present invention is shown in FIGS. 1 through 5. Collar and stud assembly 10 may be attached to an animal for one or more reasons. For example, stud 14 of collar and stud assembly 10 may be used as a single purpose tag, e.g., a rabies tag or license tag. Stud 14 may also incorporate an identification code so that assembly 10 may be used as a convenient means to identify an animal, especially a pet that is lost. In some embodiments, stud 14 may incorporate electronics that allow assembly 12 to facilitate animal control or training, animal feed control, animal tracking control, and the like. Collar and stud assembly 10 may also incorporate therapeutic agents so that assembly 10 can be attached to an animal for therapeutic reasons, e.g., as a flea collar, to control asthma, or otherwise to deliver a therapeutic agent topically or transdermally.

Collar and stud assembly 10 includes collar 12 and stud 14 attached to collar portion 16 of collar 12. Collar 12 is formed from strap 18 having first end 20 and second end 22. First end 20 and second end 22 can be disengaged to open collar 12, or, alternatively, first end 20 and second end 22 can be engaged to close collar 12 as shown best in FIG. 1. Closure device 24 is used to operationally engage first end 20 to second end 22 to close collar 12. The type of closure device 24 used in collar 12 is not critical and any conventional closure 24 known in the art can be used. For purposes of illustration, closure device 24 as illustrated is a buckle in which the buckle is attached to first end 20. To close collar 12, second end 22 operationally engages buckle 26 in a conventional manner.

As an alternative to such a buckle, another illustrative closure device is a pair of mating clips with a double press lock of the type included on a collar commercially available under the trade designation LET'S GO from Hartz Canada Inc. Each member of the clip pair is attached to the respective end of a collar strap. One member is then inserted into the other member with a snap engagement to lock the clips and close the collar. The collar is opened by pressing two levers on each side of the assembly, which allows the members to be pulled apart. An embodiment of the invention including such a clip pair is illustrated below in FIGS. 9 and 10.

Strap 18 can be heavy duty, of medium weight construction, or lightweight, depending upon the intended use of collar 12 and the size of the animal that wears collar 12. For example, if collar 12 is to be used for containment purposes, i.e., to help control a larger animal, collar 12 is desirably of a heavier weight construction. On the other hand, if collar 12 is to be used for smaller animals, adornment, and/or for therapeutic purposes (e.g., as a flea collar or asthma collar), collar 12 may be of lighter weight construction. Strap 18 may also be made from a wide variety of natural, synthetic, and/or fabricated materials such as one or more polymers (e.g., polyurethane, polyester, nylon, rayon, combinations of these, and the like), cotton, leather, metal (e.g., chain links), and/or the like. Strap 18 may also be of any desired color or decoration, depending upon taste. Black, red, blue, and green currently are most popular.

Collar stud 14 is attached to collar 12 via engagement with collar aperture 30 in collar portion 16. In the preferred embodiment illustrated, collar stud 14 includes cap 32 positioned adjacent exterior surface 34 of collar portion 16. Stud 14 also includes base 36 positioned adjacent interior surface 38 of collar portion 16. Linkage 40 extends through collar aperture 30 and interconnects cap 32 and base 36. Linkage 40 is in the form of a threaded, male post, also referred to herein as a threaded stud shaft, that is attached to and extends from underside 42 of cap 32 to threadably engage corresponding female aperture 44 in base 36. Cap 32 and base 36 can be tightened together via threadable engagement until stud 14 is firmly secured in place with collar portion 16 sandwiched between cap 32 and base 36. Each of cap 32 and base 36 optionally has gripping structure, such as serrations 43 and 45, respectively, to more securely grip strap 18. Such gripping structure is especially useful to help hold base 36 stationary as linkage 40 is initially threadably engaged into female aperture 44.

Cap 32 can have a wide variety of shapes and colors. Representative shapes include circular (as shown), rectilinear, heart-shaped, bone shaped, bow shaped, triangular, multifaceted, cylindrical, saddle shaped, paw shaped, skull shaped, vehicle shaped, fish shaped, food shaped, holiday shaped, and the like. Cap 32 also can be provided with any one or more of a wide variety of colors without limitation. Virtually and desired color and design can be used, especially when cap 32 is functioning at least in part as a fashion statement, decorative statement, or other adornment purpose. However, if stud 14 is to function as a rabies or license tag, cap 32 should be colored and shaped to conform to current regulatory requirements applicable to rabies or license tags. To promote visibility of the animal at night, cap 32 may also have a retroreflective surface to allow cap 32 to function also as a reflector.

Cap 32 may also be provided with visually discernible information in the form of graphics, alphanumeric characters, bar codes, and/or the like. For example, as shown, cap 32 bears alphanumeric characters that will help locate and contact the owner of the animal in the event that the animal is lost. Specifically, the alphanumeric characters on cap 32 include a unique identification code 46 that can be associated specifically with the animal wearing stud 14. The owner of the animal could take action to ensure that the identification code 46 and other information about the animal, preferably information allowing the owner to be identified and contacted, could be entered as a data record in a centralized database, preferably a computerized database. The owner could accomplish this by contacting the database service provider with the information by phone, facsimile, regular mail, electronic mail, the internet, or other suitable means. A photograph, or digitized image in the case of computerized databases, of the animal could also be included in the animal's data record to provide further proof of the animal's identity. The database is set up so that the identification code 46 can be used by authorized personnel to locate the corresponding data record for the animal.

Cap 32 further includes alphanumeric contact information, preferably in the form of a toll-free number 48 and a web site address 50, that can be used to contact the database service provider. Thus, if the animal wearing stud 14 were to ever get lost and then found by a third party, the third party could use the contact information to contact the database service provider. The identification code 46 can be obtained from cap 32 and used by authorized personnel to identify the owner of the lost animal. The owner could then be contacted so that the animal can be returned to its home.

Just as a screw has a tool engaging structure on its head to allow a screw driver to engage and rotatably drive the screw into place, cap 32 is optionally provided with tool engaging structure 52 on upper surface 54 so that a corresponding tool 56 can be used to help threadably engage cap 32 with base 36. A wide variety of tool engaging structures and corresponding tools can be used in the practice of the present invention. The specific approach used in any instance depends upon factors including the level of security by which stud 14 is to be removable from collar 12 once stud 14 is attached to collar 12.

Where security is of lesser concern, tool engaging structure 52 and corresponding tool 56 may have structures associated with common household items to permit stud 14 to be easily removed without much difficulty. The embodiment of collar assembly 10 shown in FIGS. 1 through 5 is an example of a low security approach in that tool engaging structure 52 is in the form of a hexagonal aperture for engaging allen wrench tool 56. As an alternative, tool engaging structure can be in the form of slot(s) for engaging a standard or phillips screw driver. As another alternative, tool engaging structure can be a slot that is sized to engage a coin, such as a nickel, dime, penny, or quarter, that can be used as tool to attach and detach stud 14 from collar 12. Where security is of greater concern, tool engaging structure 52 may be in the form of a key structure that can only be engaged by a unique key. This approach allows stud 14 to be attached and detached from collar 12 only by authorized personnel having the key, such as the owner or primary caregiver of the animal.

Stud 14 optionally incorporates transponder 58. Although transponder 58 may be incorporated into cap 32, linkage 40, or base 36, or any other portion of stud 14, transponder 58 is illustrated as being positioned inside linkage 40. Transponder 58 includes a memory having storage capacity sufficient for storing information comprising data representative of an individual identification code which is desirably identical to alphanumeric identification code 46 imprinted onto upper surface 54 of cap 32. For purposes of illustration, the identification code associated with transponder 58 of the Figures is the ten bit binary word "1010101010". However, this particular code is only intended to be representative of one type of identification code useful in the practice of the present invention, and other coding approaches could be used.

For example, depending upon factors such as the nature of the memory, or the overall storage capacity of the memory, or the total number of unique identification codes to be available, identification codes comprised of more or less than 10 bits of information may also be used in the practice of the present invention. Although most commonly stored in binary form, the identification code may be otherwise referred to by its corresponding alphanumeric form.

In addition to storing the identification code, additional storage capacity of the transponder memory, if any, may be used to store additional information such as transponder operational programming, coding, messages, user information, owner information, access information for accessing a database including records comprising information relating to a plurality of identification codes and corresponding code recipients, and the like. In some embodiments of the invention, transponder 58 may incorporate a temperature sensor to allow the temperature of the host animal to be monitored. In other embodiments, transponder 58 may incorporate programming that provides transponder 58 with GPS capability.

In the practice of the present invention, at least a portion of the memory of transponder 58 may be a read/write type of memory. This allows the information content of the memory to be reversibly stored in the memory and can be changed as many times and as often as desired. Alternatively, at least a portion of the memory of transponder 58 may be a write once/read many type of memory so that the information content of the memory is irreversibly stored in the memory and cannot be changed.

Figure 5:
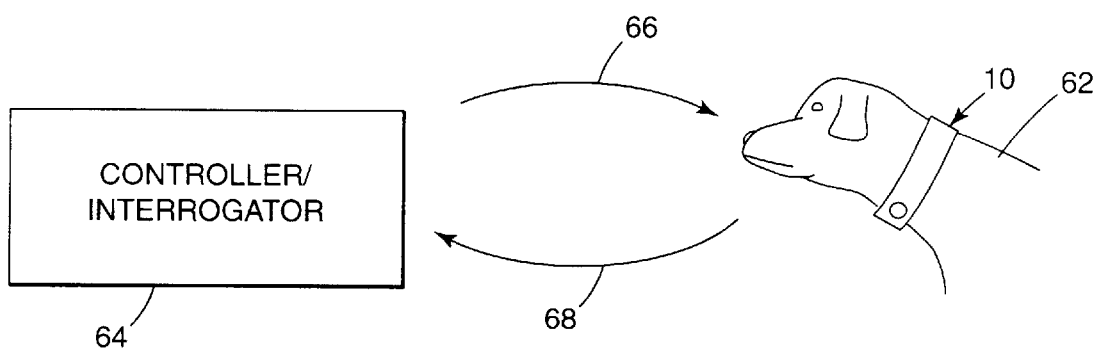
FIG. 5 is a schematic diagram showing how a transponder can be remotely interrogated using an interrogator unit.

The identification code stored in the memory of transponder 58 becomes associated with a particular animal when collar and stud assembly 10 is attached to the animal. Thereafter, the memory of transponder 58 can be remotely read and/or programmed, as the case may be, using an interrogator unit in order to determine the identification code or other information stored in the memory. This procedure is schematically shown in FIG. 5. Referring to FIG. 5, an animal 62 wears collar and stud assembly 10. In order to determine information comprising the identification code stored in transponder 58 and associated with animal 62, interrogator unit 64 transmits an interrogation signal 66 to transponder 58. After receiving and processing the interrogation signal 66, transponder 58 transmits response signal 68 back to the interrogation unit 64 or other receiver. Response signal 68 has encoded therein information comprising the identification code stored in the memory of transponder 58. Hence, by interrogating transponder 58, the identification code associated with animal 62 is easily determined.

Transponders suitable in the practice of the present invention may be internally powered, such as by a replaceable battery. Alternatively, a transponder used in the practice of the present invention may also be a so-called "parasitically powered", passive device that is parasitically powered by energy from an external device instead. Parasitically powered, passive transponders are well known in the art, and a variety of such transponder models are commercially available from a variety of different vendors. Any such passive transponder could be conveniently used in the practice of the present invention. A specific example of suitable transponders are commercially available from Destron Fearing Inc. (www.destronfearing.com). Such passive transponders tend to be relatively small object. For example, these fully operable transponders closely resemble a single grain of white rice in both size and shape.

In order to prevent interference with transponder operation, the components of stud 14 are desirably fabricated from one or more materials that do not unduly interfere with electronic signals. Examples of suitable materials include polymers, wood, ceramic, and the like. The use of metals, metallic alloys, or the like is preferably avoided since such materials tend to cause too much interference.

In FIGS. 1 through 5 stud 14 is attached to collar portion 16 in a manner such that stud 14 can function as an ornamental or functional animal tag lacking the undesirable jingling associated with conventional animal tangs that hang from a collar. The present invention is even more versatile, however, because a stud of the present invention can also function as a lock to prevent a collar from inadvertently opening and falling off the host animal.

Figure 6:
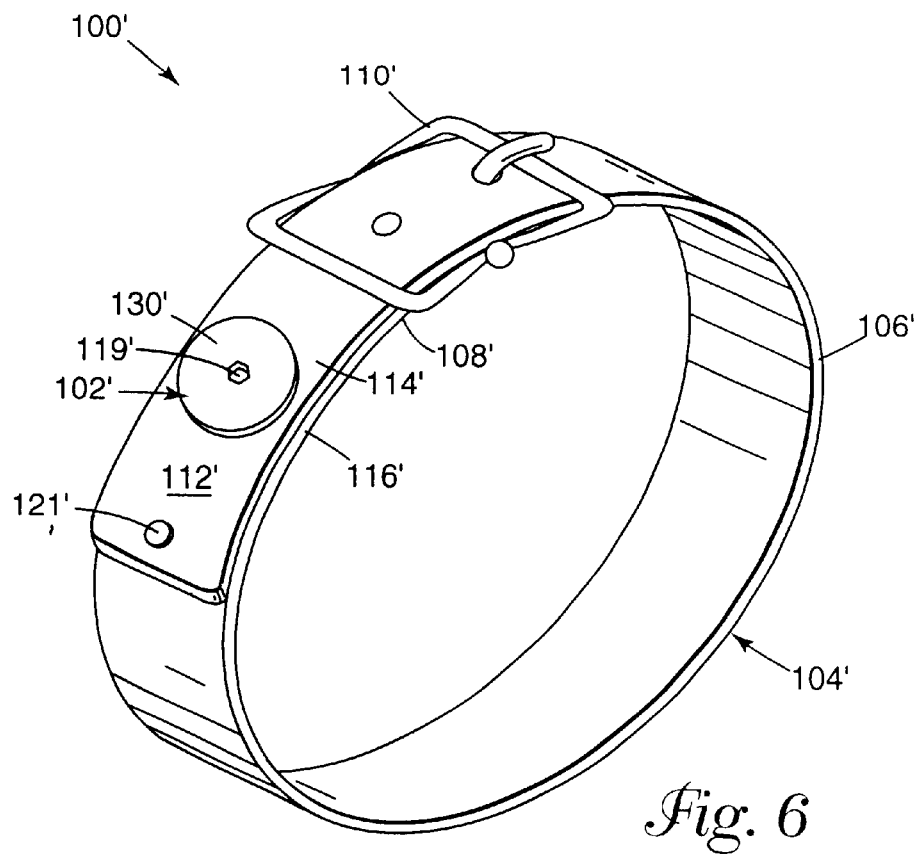
FIG. 6 is an alternative embodiment of a collar and stud assembly in which the stud also functions as a lock.
Figure 7:
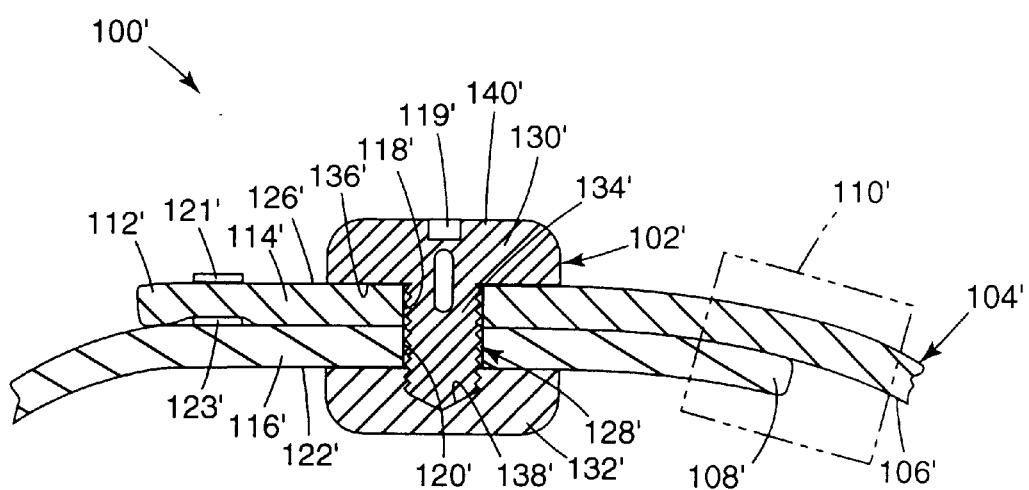
FIG. 7 is a side cross section of a portion of the assembly of FIG. 6, wherein the collar buckle is represented schematically to allow the overlap of the collar ends to be seen more clearly.

For example, FIGS. 6 and 7 show an embodiment of a collar and stud assembly 100' of the present invention in which stud 102' functions at least in part as a lock for collar 104'. Collar 104', shown in a closed position, includes strap 106' having first end 108 attached to a closure in the form of buckle 110'. Second end 112' of strap 106' is engaged with buckle 110' and extends far enough through buckle 110' such that second end 112' and a length 114' of strap 106' proximal to second end 112' overlaps underlying length 116' of strap 106'. An upper aperture 118' is registrably aligned with lower aperture 120' to create a passage 128' extending from interior surface 122' of the overlapping lengths 114' and 116' to the exterior surface 126' of the overlapping lengths 114' and 116'.

To help registrably align upper and lower apertures 118' and 120', poppets 121' and 123' are included on strap 106'. When these poppets 121' and 123' are aligned with each other, which is relatively easy to do, apertures 118' and 120' will also be aligned as well. Poppets may also be used to limit the range of motion of an adjustable collar. For instance, one or more poppets may be placed in proximity to a buckle or other obstruction so that the circumference of the collar may vary by a limited amount, e.g., two inches (5 cm). This will help to ensure that a collar does not become inadvertently detached from a pet.

Collar stud 102', generally identical to stud 14 of FIGS. 1 through 5 is attached to collar 104' via engagement with through passage 128' in overlapping collar lengths 114' and 116'. In the preferred embodiment illustrated, collar stud 102' includes cap 130' positioned adjacent exterior surface 126'. Stud 102' also includes base 132' positioned adjacent interior surface 122'. Cap 130' and base 132' optionally incorporate gripping structure (not shown), such as serrations, other texture, or the like, to more securely grip collar 104'. Linkage 134' extends through passage 128' and interconnects cap 130' and base 132'. Linkage 134' is in the form of a threaded, male post that is attached to and extends from underside 136' of cap 130' to threadably engage corresponding female aperture 138' in base 132'. Cap 130' and base 132' can be tightened together via threadable engagement until stud 102' is firmly secured in place with collar lengths 114' and 116' sandwiched between cap 130' and base 132'. Collar stud incorporates transponder 140'. Tool engaging structure 119 provides structure to allow a tool (not shown) to operatively engage cap 130 for insertion and removal of stud 102.

Because of the way stud 102' engages overlapping lengths 114' and 116', stud 102 essentially locks overlapping lengths 114' and 116' together, to prevent movement of second end 112' relative to the remainder of strap 106'. The collar 104' is thus locked and the probability that the collar will inadvertently open and fall off the animal is substantially reduced, if not eliminated.

Figure 8A:
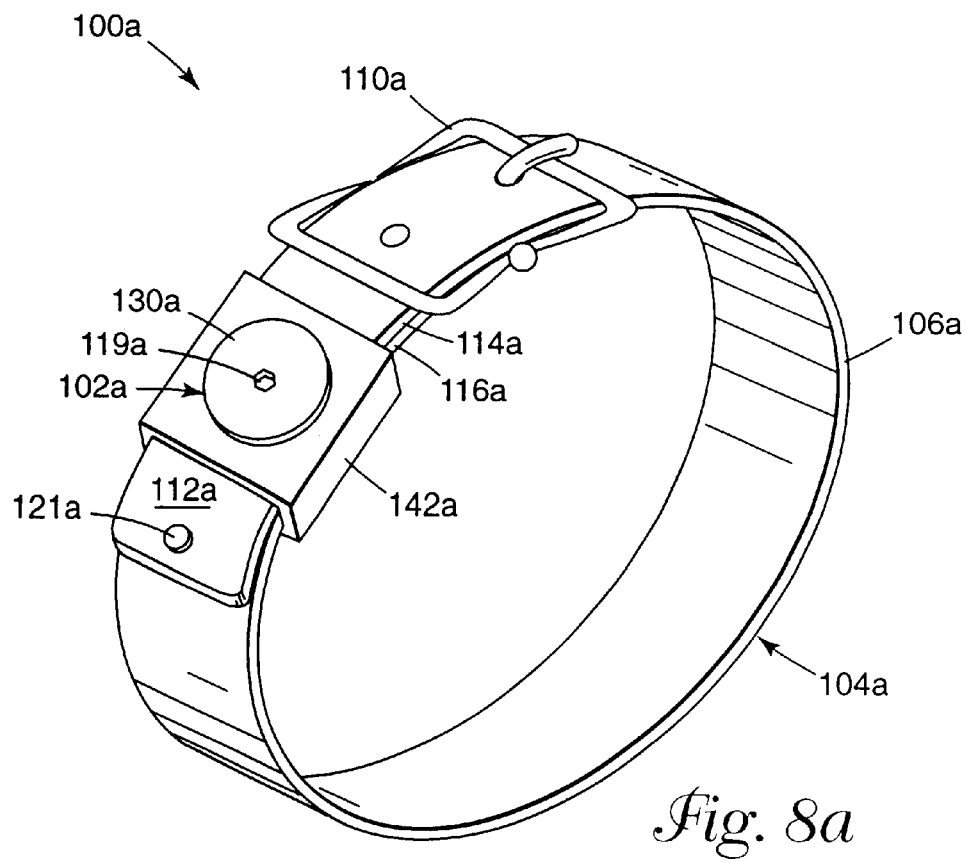
FIG. 8a is a perspective view of an alternative embodiment of the present invention in which the attachment of the stud to the collar is reinforced with a sleeve.
Figure 8B:
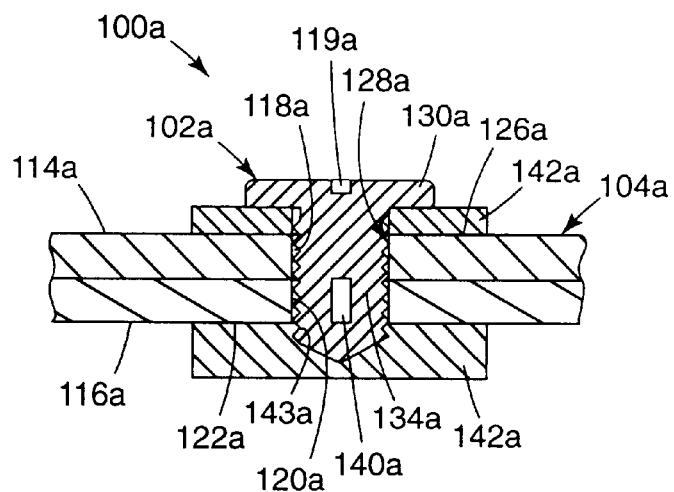
FIG. 8b is a side cross-section of a portion of the collar and stud assembly of FIG. 8.

In some instances, it may be desirable to reinforce the collar portion(s) to which a stud of the present invention is attached. For example, FIGS. 8a and 8b show a collar and stud assembly 100 that is identical to that of FIGS. 6 and 7 except that an optional sleeve 142 is provided for reinforcement. As another advantage, sleeve 142 also provides more visually discernible information onto collar and stud assembly 100 as well. As an additional difference, linkage 40 engages female aperture 143 of sleeve 142. Note from FIG. 8b that the portion of sleeve 142 adjacent length 116 serves as the base in this embodiment to threadably receive linkage 134.

Figure 9:
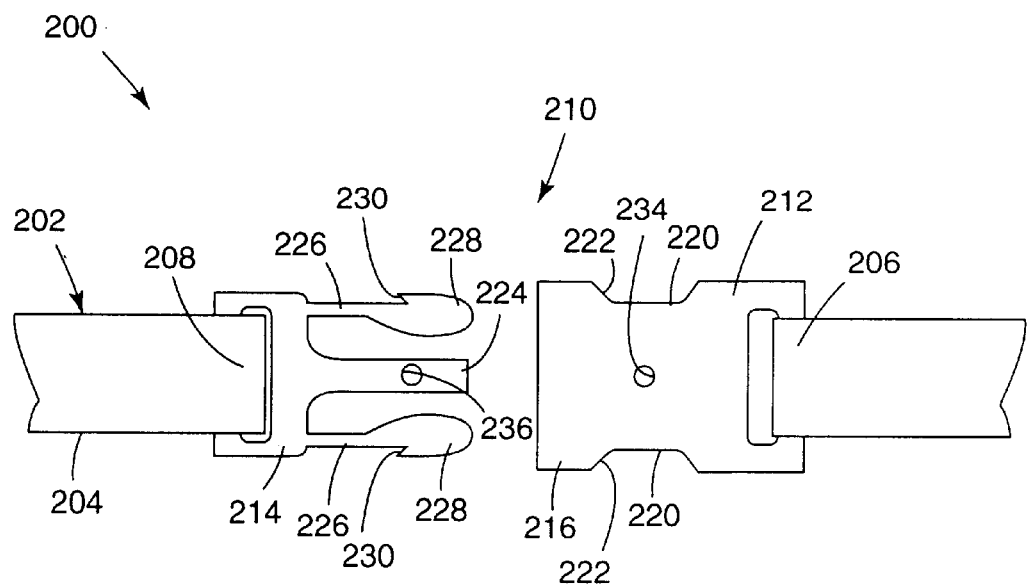
FIG. 9 is a top view of a collar whose closure includes male and female clips.
Figure 10:
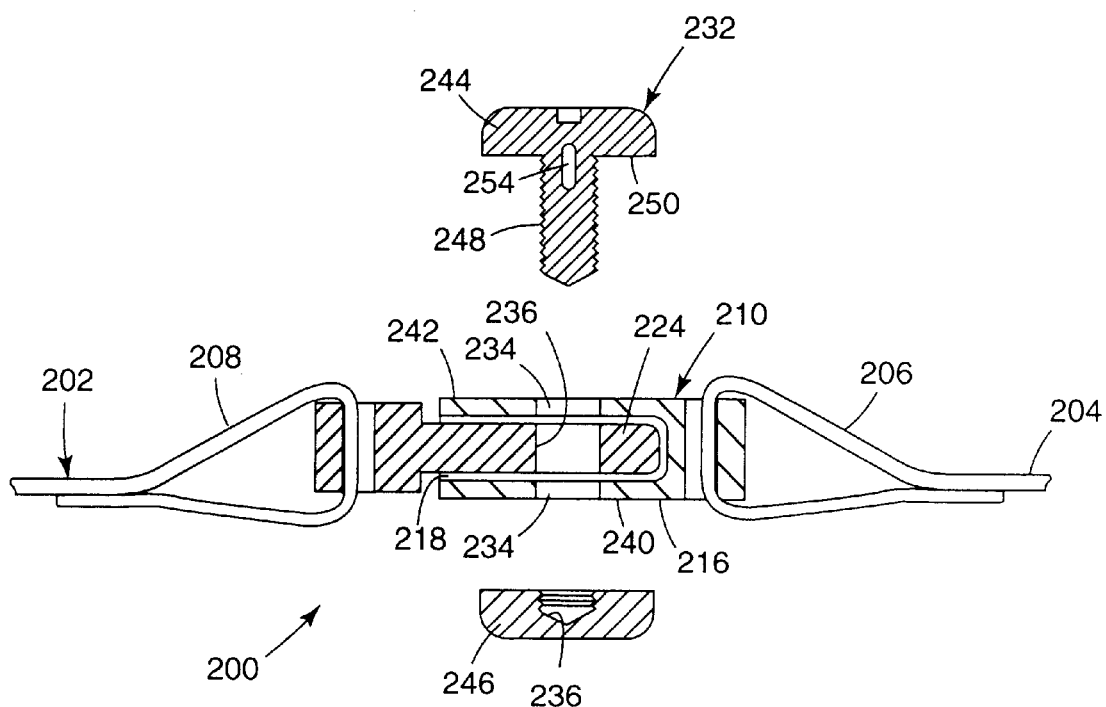
FIG. 10 is a side cross section of the collar of FIG. 9, wherein the male clip has been inserted into the female clip with apertures aligned so that the cap and base of the illustrated stud can be attached to the clips.

Of course, using a stud to lock overlapping lengths of a collar strap together is not the only way in which a stud of the present invention can function as a collar lock. For instance, as an alternative, a stud of the present invention can also be used to lock overlapping portions of a collar closure. FIGS. 9 and 10 show an example of a collar and stud assembly 200 with this feature. Collar and stud assembly 200 includes collar 202 comprising strap 204 having first end 206 and second end 208. A closure 210 includes female clip 212 attached to first end 206, and a male clip 214 attached to second end 208. Female clip 212 includes housing 216 having front portal 218 and side portals 220, each having abutment 222. Male clip includes middle prong 224 and outer resilient prongs 226. Each of resilient prongs 226 include head 228 and shoulder 230.

To close collar 202, male clip 214 is inserted into female clip 212. During insertion, resilient prongs 226 are resiliently deflected toward middle prong 224. When male clip 214 is fully inserted, resilient prongs 226 spring outward through side portals 220. Abutments 222 provide a stop against shoulders 222 to hold male clip 214 inside female clip 212. To open closure 210, heads 228 are resilient pressed together until shoulders 230 are clear of abutments 222. Male clip 214 can then be easily pulled from female clip 212 to open collar 202.

Although easy to operate, clips 212 and 214 have a tendency to inadvertently fall open on occasion. Stud 232 of the present invention prevents this by locking clips 212 and 214 together. To engage stud 232, female clip 212 includes apertures 234, and male clip 214 includes aperture 236 located in middle prong 224. Apertures 234 and qq are registrably aligned when male clip 214 is inserted into female clip 212. This forms through passageway 238 extending from interior surface 240 of closure 210 to exterior surface 242 of closure 210.

Collar stud 232, generally identical to stud 14 of FIGS. 1 through 5 is attached to closure 210 via engagement with through passageway 238. In the preferred embodiment illustrated, collar stud 232 includes cap 244 positioned adjacent exterior surface 242. Stud 232 also includes base 246 positioned adjacent interior surface 240. Linkage 248 extends through collar aperture 236 and interconnects cap 244 and base 246. Linkage 248 is in the form of a threaded, male post that is attached to and extends from underside 250 of cap 244 to threadably engage corresponding female aperture 236 in base 246. Cap 244 and base 246 can be tightened together via threadable engagement until stud 232 is firmly secured in place with clips 212 and 214 sandwiched and locked together between cap 244 and base 246. Stud 232 incorporates transponder 254.

Figure 11:
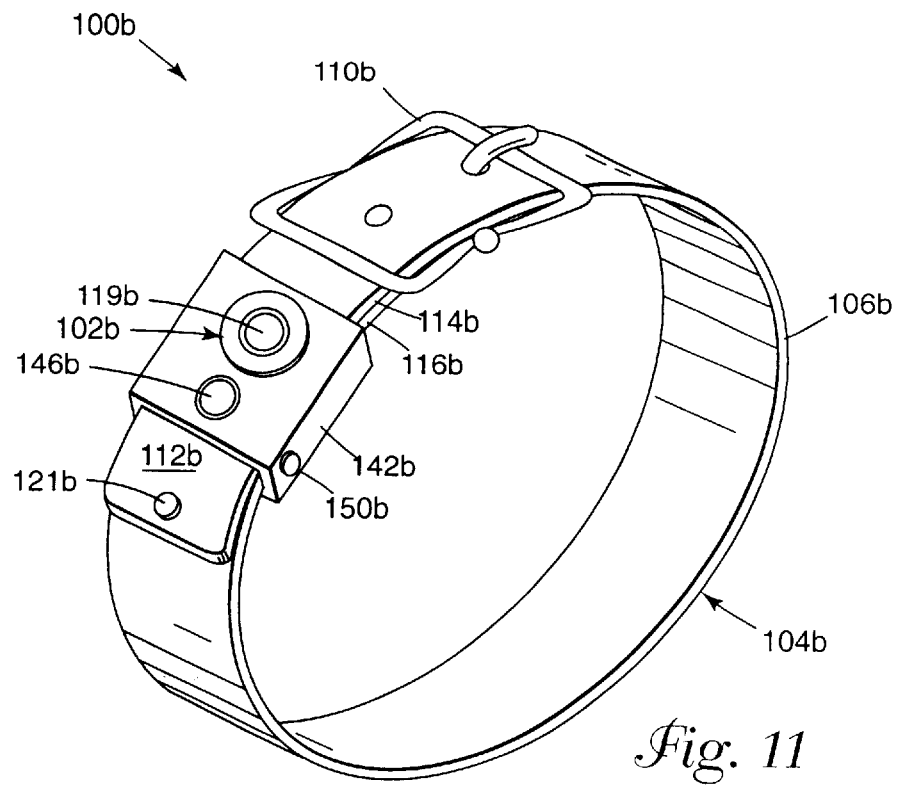
FIG. 11 is a perspective view of a collar and stud assembly of the present invention in which the stud assembly incorporates a visual alarm in the form of a flashing LED light.
Figure 12:
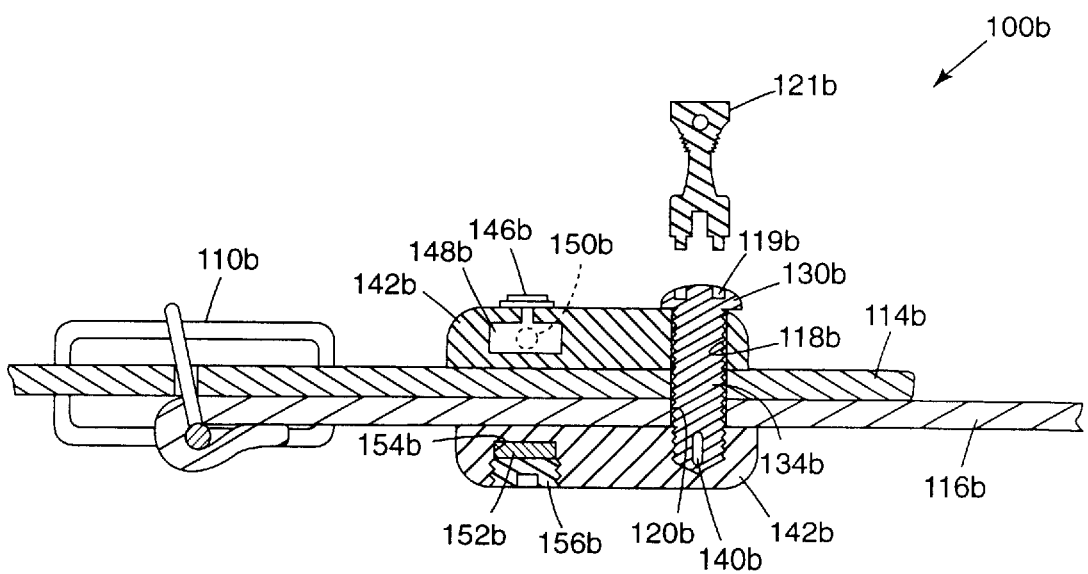
FIG. 12 is a side cross-section of a portion of the collar and stud assembly of FIG. 11.

FIGS. 11 and 12 show an alternative embodiment of a collar and stud assembly 100b that is generally identical to assembly 100a of FIGS. 8a and 8b except for seven differences. First, cap 130b is smaller and is positioned off-center toward one side of sleeve 142b. Second, key engaging structure 119b is a more complex keyhole operated by special key 121b. Third, laser flashing diode 146b is provided as a visual alarm on the top of sleeve 142b. Commonly, commercially available laser flashing diodes are available in red or yellow. Fourth, circuit board 148b is provided in sleeve 142b in order to control diode 146b. Fifth, diode 146b is actuated by on-off button 150b. Sixth, sleeve 142b incorporates a power source 152b, here a battery, for circuit board 148b, diode 146b, and/or transponder 140b. Power source is housed in compartment 154b. Cover 156b can be removed to replace power source 152b, as desired. Seventh, transponder 140b incorporates a temperature sensor and is positioned more toward the bottom of linkage 134b. This allows the sensed temperature to be more indicative of the actual temperature of the host animal.

Figure 13:
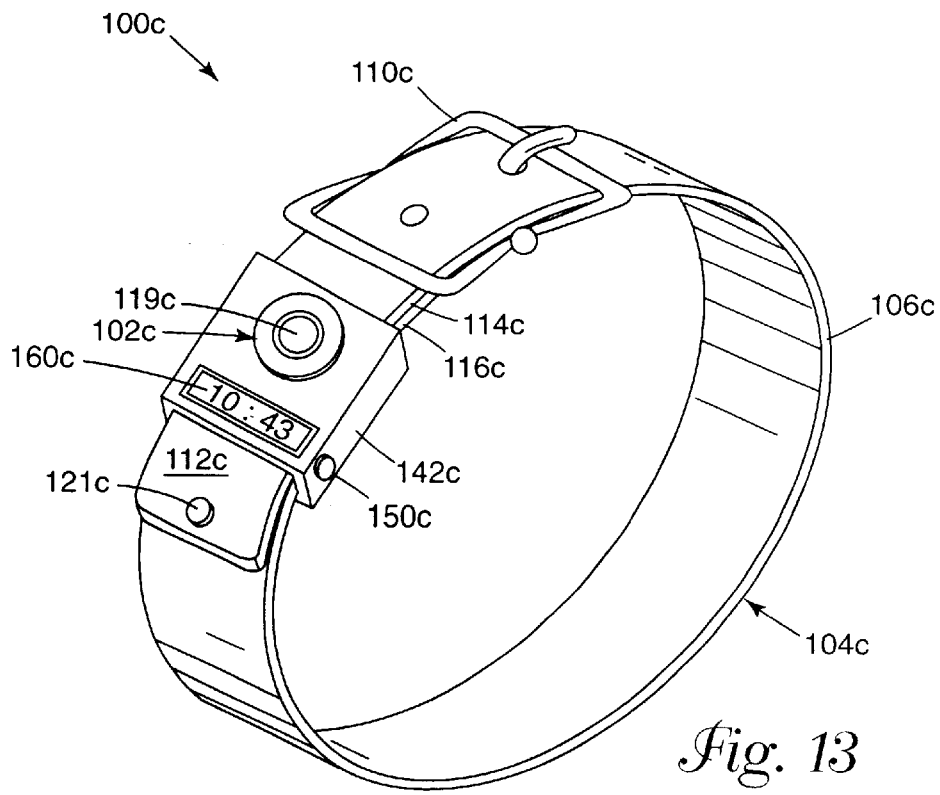
FIG. 13 is a perspective view of a collar and stud assembly of the present invention in which the stud assembly incorporates timing electronics and includes a visually discernibly time display.
Figure 14:
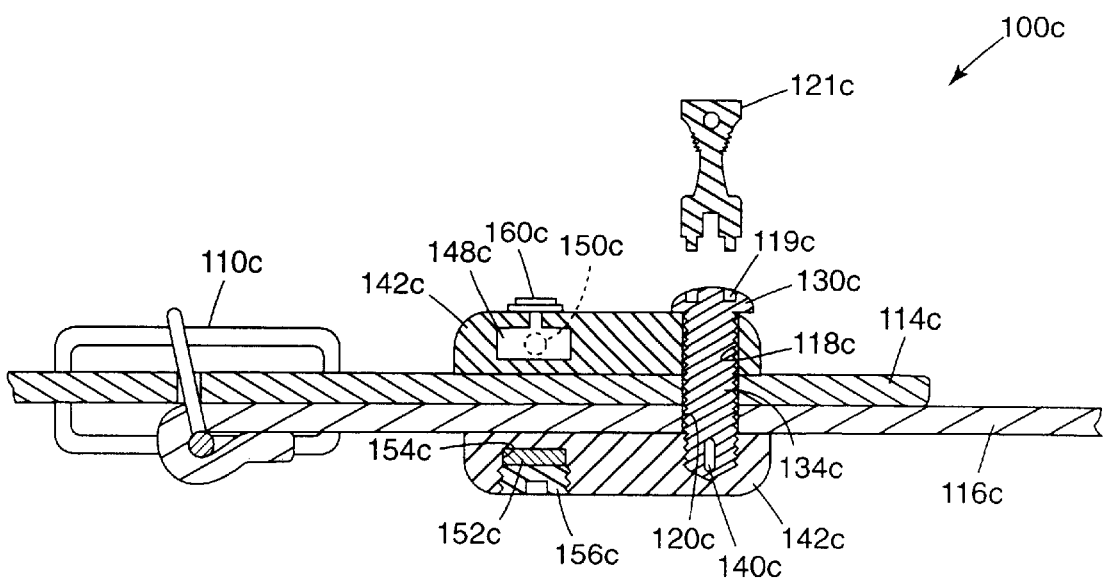
FIG. 14 is a side cross-section of a portion of the collar and stud assembly of FIG. 13.

FIGS. 13 and 14 show an embodiment of a collar and stud assembly 100c that is identical to assembly 100b of FIGS. 11 and 12, except that assembly 100c of FIGS. 13 and 14 includes display 160c instead of diode 146b. Additionally, circuit board 148c includes programming allowing time information to be shown on display 160c.

Figure 15:
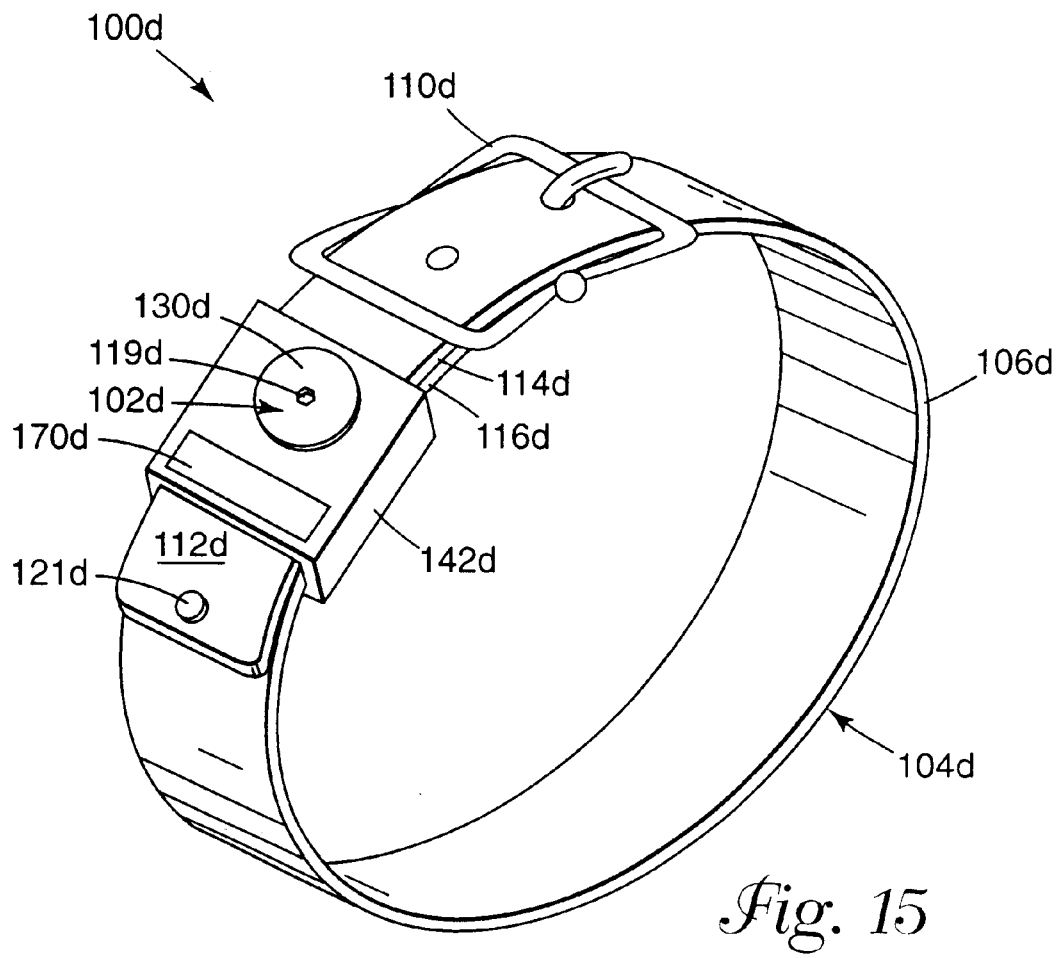
FIG. 15 is a perspective view of an collar and stud assembly of the present invention in which a visually discernible temperature sensor is provided on the stud assembly.

FIG. 15 shows an embodiment of a collar and stud assembly 100d of the present invention that is identical to assembly 100b of FIGS. 8a and 8b, except for four differences. First, in FIG. 15, cap 130d is smaller and is positioned off-center toward one side of sleeve 142d. Second, key structure 119d is more complex as is the case of FIGS. 11 and 12. Third, a temperature sensor 170d, preferably in the form a strip of temperature sensitive crystals, is attached to 142d to provide a visually discernible output indicative of the temperature of the host animal. Fourth, transponder 140d optionally incorporates temperature sensing functionality in a manner similar to the device of FIGS. 11 and 12.

Figure 16:
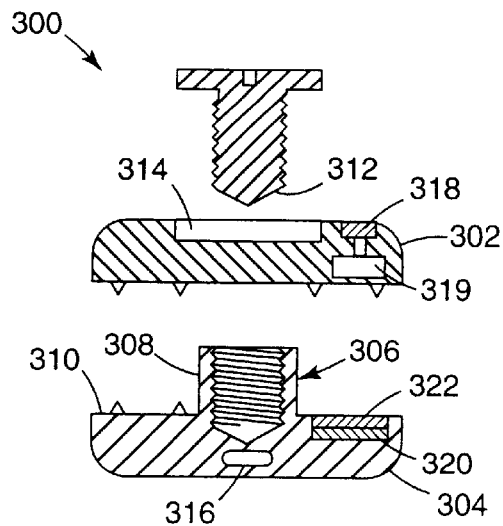
FIG. 16 is a side cross section of an alternative stud of the present invention.

FIG. 16 illustrates an alternative embodiment of a stud 300 of the present invention. Stud 301 includes cap 302 and base 304. Linkage 306 interconnects cap 302 to base 304 and includes female threaded post 308 extending from inner face 310 of base 304 toward cap 302. Cap 302 is secured to post 308 with screw 312. Cap 302 includes counterbored pocket 314 for receiving screw 312. Transponder 316 is incorporated into base 304. Optional laser diode 318 may be actuated to flash in response to a variety of programming. For example, if the host animal wearing stud 300 is on a therapeutic regime, diode 318 can be actuated when follow up action is required. Alternatively, if transponder 316 incorporates temperature sensing functionality, then diode 318 can be actuated with the sensed temperature is outside of a specified range. Circuit board 319 controls diode 318. Power source 320, preferably a battery, is housed in base 304 and is operationally coupled to diode 318 and circuit board 319 in order to power diode and circuit board operations. Cover 322 can be removed to replace power source 320 as desired.

Figure 17:
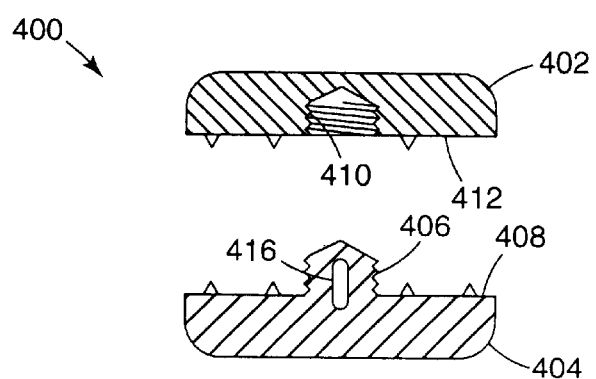
FIG. 17 is a side cross section of an alternative stud of the present invention.

FIG. 17 illustrates another embodiment of a stud 400 of the present invention. Stud 400 includes cap 402 and base 404. Linkage 406 is in the form of a threaded post that extends from inner surface 408 of base 404 toward cap 402. Linkage 406 threadably engages female threaded aperture 410 on underside 412 of cap 414. Transponder 416 is incorporated into linkage 406.

Figure 18:
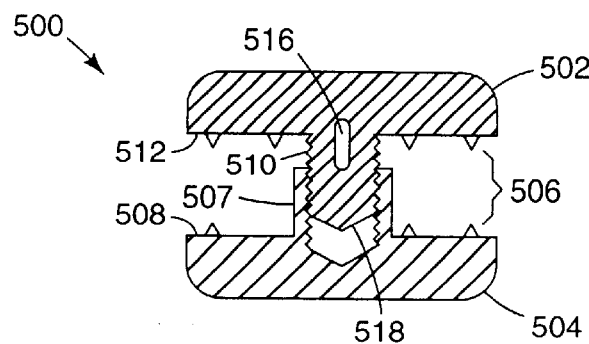
FIG. 18 is a side cross section of an alternative stud of the present invention in which the stud shaft is partially inserted into a mating, female threaded post.

FIG. 18 illustrates another embodiment of a stud 500 of the present invention. Stud 500 includes cap 502 and base 504. Linkage 506 interconnects cap 502 and base 504. Linkage 506 includes a female threaded post 507 extending from inner surface 508 of base 504 toward cap 502. Male threaded post 510 extends from inner surface 512 of cap 502 toward base 504. To secure cap 502 to base 504, male threaded post 510 threadably engages female threaded post 507. Transponder 516 is incorporated into male threaded post 510. The tip 518 has a self-tapping point analogous to that provided on a sheet screw. The self-tapping tip 518 allows post 510 to be rotatably driven through a collar without predrilling a pilot hole to receive post 510. As a preferred design option for this embodiment (or any other embodiment having a female aperture that is threadably engaged by a male linkage member), female threaded post 507 is slightly undersized to ensure that male threaded post 510 is securely fastened to base 504.

Figure 19:
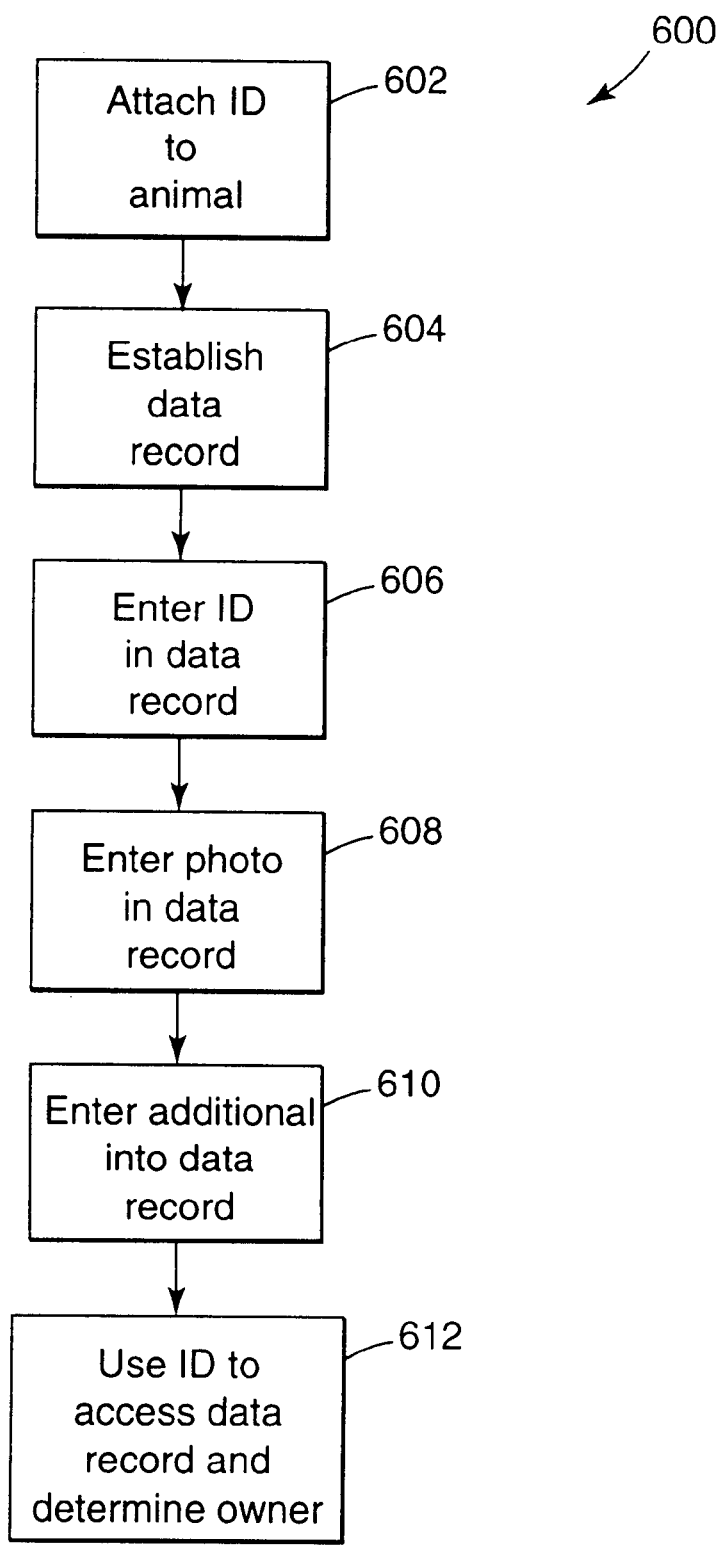
FIG. 19 is a schematic flow chart of a system of the present invention used for pet identification.

FIG. 19 is a flow chart 600 showing how the collar and stud assembly of the present invention can be used with an internet-based database or registry. Such a database will comprise a plurality of data records, each record comprising information corresponding to a particular animal. In step 602, a collar and stud assembly of the present invention having a unique identification code is attached to an animal such as a cat or dog. The identification code may be a visually discernible code and/or an electronic code stored in the memory of a transponder. In step 604, a data record for the animal is established in the on-line database. In step 606, the transponder identification code of the stud is added to the animal's data record. In step 608, a photograph of the dog is taken and stored in the animal's data record in the on-line database. This is done in such a way that the identification code can be used as an input to gain access to the animal's data record. In step 610, additional information allowing the animal owner to be contacted by a third party is also added to the data record. Now, if the animal is lost and then found by a third party, the third party can follow instructions on the stud and/or collar to use the transponder identification code to access the on-line photo and other information associated with the animal in step 612. The owner can be contacted and reunited with his pet.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A collar locking stud that is attachable to aligned apertures of overlapping portions of an animal collar, said stud comprising:
    (a) a cap positionable adjacent an exterior surface of the collar;
    (b) a base positionable adjacent an interior surface of the collar; and
    (c) a linkage interconnecting the cap and base in a spaced apart fashion to allow a collar portion to be sandwiched between the interconnected cap and the base in a manner such that at least a portion of the linkage can extend through the aligned apertures and to help secure the stud to the collar; and
    (d) visually discernible information provided on the stud, said information corresponding to regulatory information and comprising a unique identification code.

2. The collar locking stud of claim 1, wherein the stud comprises a temperature sensor that provides an output indicative of the temperature of a host animal.

3. The collar locking stud of claim 1, wherein the stud comprises remotely interrogable programming effective to operationally couple the stud to a global positioning system such that the position of a host animal wearing the stud can be determined by remote interrogation.

4. The collar locking stud of claim 1, wherein the cap comprises a tool engaging structure that facilitates attachment and detachment of the cap to the base.

5. The collar locking stud of claim 1, wherein the overlapping collar portions comprise overlapping lengths of a collar strap.

6. The collar locking stud of claim 1, wherein the overlapping collar portions comprise overlapping portions of a collar closure.

7. The collar locking stud of claim 1, further comprising a reinforcing sleeve.

8. The collar locking stud of claim 7, wherein the base is a portion of the sleeve adjacent an interior of the collar.

9. The collar locking stud of claim 1, further comprising timer programming and a display operationally coupled to the timer programming, wherein the display outputs time information.

10. The collar locking stud of claim 1, wherein said regulatory information comprises rabies vaccination information provided on the stud.

11. The collar locking stud of claim 1, wherein said regulatory information comprises animal license information provided on the stud.

12. A locked animal collar assembly, comprising:
    (a) a closed collar having first and second overlapping collar portions, each collar portion comprising respective first and second apertures, wherein said first and second apertures are registrably aligned;
    (b) a collar locking stud releasably attached to the aligned apertures, wherein the collar stud comprises:
        (i) a cap positionable adjacent an exterior surface of the collar;
        (ii) a base positionable adjacent an interior surface of the collar; and
        (iii) a linkage releasably interconnecting the cap and base in a spaced apart fashion to allow a collar portion to be sandwiched between the interconnected cap and the base in a manner such that at least a portion of the linkage extends through the aligned apertures and helps secure the stud to the collar; and
    wherein the stud comprises visually discernible information provided on the stud, said information corresponding to regulatory information and comprising a unique identification code, said identification code being used to identify the host animal wearing the collar assembly.

13. The collar assembly of claim 12, wherein the stud comprises a temperature sensor that provides an output indicative of the temperature of a host animal.

14. The collar assembly of claim 12, wherein the stud comprises remotely interrogable programming effective to operationally couple the stud to a global positioning system such that the position of a host animal wearing the stud can be determined by remote interrogation.

15. The collar assembly of claim 12, wherein the cap comprises a tool engaging structure that facilitates attachment and detachment of the cap to the base.

16. The collar assembly of claim 12, wherein the overlapping collar portions comprise overlapping lengths of a collar strap.

17. The collar assembly of claim 12, wherein the overlapping collar portions comprise overlapping portions of a collar closure.

18. The collar assembly of claim 12, further comprising a reinforcing sleeve.

19. The collar assembly of claim 18, wherein the base is a portion of the sleeve adjacent an interior of the collar.

20. The collar assembly of claim 12, further comprising timer programming and a display operationally coupled to the timer programming, wherein the display outputs time information.

21. The collar assembly of claim 12, wherein said regulatory information comprises rabies vaccination information provided on the stud.

22. The collar locking stud of claim 12, wherein said regulatory information comprises animal license information provided on the stud.

23. A collar and tag assembly, comprising:
  (a) a collar;
  (b) a collar tag including a tag shaft extending from the tag, said tag being attached to the collar at least in part by the tag shaft extending through at least a portion of the collar, said tag comprising a key engaging structure by which the tag is attached and detached from the collar; and
  (c) visually discernible information provided on the collar tag, said information corresponding to regulatory information and comprising a unique identification code.

24. The collar and tag assembly of claim 23, wherein the collar and tag assembly comprises a therapeutic agent administered via topical contact with the collar and tag assembly.

25. The collar and tag assembly of claim 23, wherein the assembly comprises a temperature sensor that provides an output indicative of the temperature of a host animal.

26. The collar and tag assembly of claim 23, wherein the assembly comprises remotely interrogable programming effective to operationally couple the assembly to a global positioning system such that the position of a host animal wearing the assembly can be determined by remote interrogation.

27. The collar and tag assembly of claim 23, further comprising a base that is operably attachable to the shaft to secure the assembly to a collar, wherein the assembly comprises a tool engaging structure that facilitates attachment and detachment of the shaft to the base.

28. The collar and tag assembly of claim 23, further comprising a reinforcing sleeve.

29. The collar and tag assembly of claim 28, wherein a base is a portion of the sleeve adjacent an interior of the collar.

30. The collar and tag assembly of claim 23, further comprising timer programming and a display operationally coupled to the timer programming, wherein the display outputs time information.

31. The collar and tag assembly of claim 23, wherein the assembly visually displays regulatory information provided on the collar tag.

32. The collar and tag assembly of claim 31, wherein said regulatory information comprises rabies vaccination information.

33. The collar and tag assembly of claim 31, wherein said regulatory information comprises animal license information.

34. An animal identification system, comprising:
  (a) an animal collar;
  (b) a collar stud positioned on the collar, wherein the stud comprises a unique identification code, said identification code being used to identify the host animal wearing the collar; and
  (b) a database comprising a data record corresponding to the host animal, said data record comprising information relating to the animal, wherein the identification code can be used to access the host animal's data record.

35. The system of claim 34, wherein the data record further comprises owner information corresponding to the host animal.

36. The system of claim 34, wherein the data record comprises an image of the host animal.

37. The system of claim 34, wherein the data record comprises medical information corresponding to the host animal.

38. The system of claim 34, wherein the stud is attached to overlapping portions of the collar in a manner effective to help lock the overlapping portions together.

39. The system of claim 34, wherein the stud visually displays regulatory information.

40. The system of claim 39, wherein said regulatory information comprises rabies vaccination information.

41. The system of claim 39, wherein said regulatory information comprises animal license information.

42. The system of claim 34, wherein the stud further comprises a reinforcing sleeve.

43. The system of claim 34, wherein the stud visually displays an identification uniquely corresponding to regulatory information.

44. The system of claim 43, wherein said regulatory information comprises rabies vaccination information provided on the stud.

45. The system of claim 43, wherein said regulatory information comprises animal license information provided on the stud.

46. A collar locking stud that is attachable to aligned apertures of overlapping portions of an animal collar, said stud comprising:
  (a) a cap positionable adjacent an exterior surface of the collar;
  (b) a base positionable adjacent an interior surface of the collar; and
  (c) a linkage interconnecting the cap and base in a spaced apart fashion to allow a collar portion to be sandwiched between the interconnected cap and the base in a manner such that at least a portion of the linkage extends through the aligned apertures and helps secure the stud to the collar; and
  (d) a unique identification code corresponding to the stud; and
  (e) a transponder, wherein the transponder includes a memory that stores retrievable information, said information comprising the unique identification code.

47. A collar and tag assembly, comprising:
  (a) a collar;
  (b) a collar tag including a shaft extending from the tag, said tag being attached to the collar at least in part by a tag shaft extending through at least a portion of the collar, said tag comprising a key engaging structure by which the tag is attached and detached from the collar;
  (c) a unique identification code incorporated into the assembly; and
  (d) a transponder, wherein the transponder includes a memory that stores retrievable information, said information comprising the unique identification code.

48. A locked animal collar assembly, comprising:
  (a) a closed collar having first and second overlapping collar portions, each collar portion comprising respective first and second apertures, wherein said first and second apertures are registrably aligned;

(b) a collar locking stud releasably attached to the aligned apertures, wherein the collar stud comprises:
  (i) a cap positionable adjacent an exterior surface of the collar;
  (ii) a base positionable adjacent an interior surface of the collar; and
  (iii) a linkage releasably interconnecting the cap and base in a spaced apart fashion to allow a collar portion to be sandwiched between the interconnected cap and the base in a manner such that at least a portion of the linkage extends through the aligned apertures and helps secure the stud to the collar; and
  (iv) a transponder incorporated into the stud, wherein the transponder includes a memory that stores retrievable information, said information comprising a unique identification code, said identification code being used to identify the host animal wearing the collar assembly.

* * * * *

UNITED STATES PATENT AND TRADEMARK OFFICE
CERTIFICATE OF CORRECTION

PATENT NO.   : 6,283,065 B1
DATED        : September 4, 2001
INVENTOR(S)  : Shorrock et al.

It is certified that error appears in the above-identified patent and that said Letters Patent is hereby corrected as shown below:

Column 10,
Line 18, "108" should be -- 108' --.
Line 62, "102" should be -- 102' --.

Column 11,
Line 4, "100" should be -- 100a --.
Lines 5, 6, 9 and 10, "142" should be -- 142a --.
Line 8, "100" should be -- 100a --.
Line 8, "40" should be -- 40a --.
Line 9, "143" should be -- 143a --.
Line 10, "116" should be -- 116a --.
Line 12, "134" should be -- 134a --.

Column 15,
Line 66, "(b)" should be -- (c) --.

Signed and Sealed this

Second Day of April, 2002

Attest:

*Attesting Officer*

JAMES E. ROGAN
*Director of the United States Patent and Trademark Office*